United States Patent [19]

Yamazaki et al.

[11] Patent Number: 4,664,589
[45] Date of Patent: May 12, 1987

[54] TWO-HANDED ROBOT DEVICE

[75] Inventors: Akitoshi Yamazaki; Kazunori Miyauchi, both of Osaka, Japan

[73] Assignee: Tsubakimoto Chain Company, Osaka, Japan

[21] Appl. No.: 759,025

[22] Filed: Jul. 25, 1985

[30] Foreign Application Priority Data

Jul. 30, 1984 [JP] Japan ................................. 59-157661

[51] Int. Cl.4 ............................................. B25J 15/08
[52] U.S. Cl. .................................. 414/730; 294/86.4; 294/907; 414/736; 901/46
[58] Field of Search ............... 414/725, 736, 730, 729; 901/45, 46; 294/86.4, 907, 103.1, 119.1

[56] References Cited

U.S. PATENT DOCUMENTS 4,384,397 5/1983 Nelson .......................... 414/736 X

FOREIGN PATENT DOCUMENTS 0076135 4/1983 European Pat. Off. ............ 414/730
0901046 1/1982 U.S.S.R. ............................. 414/730

Primary Examiner—Robert J. Spar
Assistant Examiner—Donald W. Underwood
Attorney, Agent, or Firm—Flynn, Thiel, Boutell & Tanis

[57] ABSTRACT

A two-handed robot device in which a hand supporting frame, which is moved to a position to grasp or release a workpiece by indexed rotation of a wristlike member, is provided with a first hand fixed on one side of the supporting frame, a striker which moves back against a spring force when touching a workpiece to be grasped by the first hand, a first detector which is made to operate by the backward movement of the striker, a second hand having its base portion fitted pivotally on the other side of the supporting frame so that it can be tilted from an engagement position toward the supporting frame and which is actuated toward the engagement position by a spring, and a second detector which is made to operate by said tilting movement of the second hand, and in which the movement of the first hand when approaching a workpiece and the movement of the second hand when approaching a workpiece stand are stopped according to the detection signals of the first and second detectors respectively.

4 Claims, 3 Drawing Figures

FIG. 1
FIG. 2
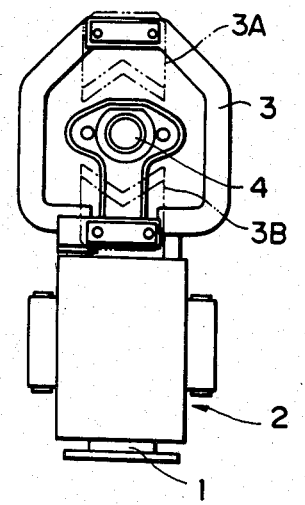
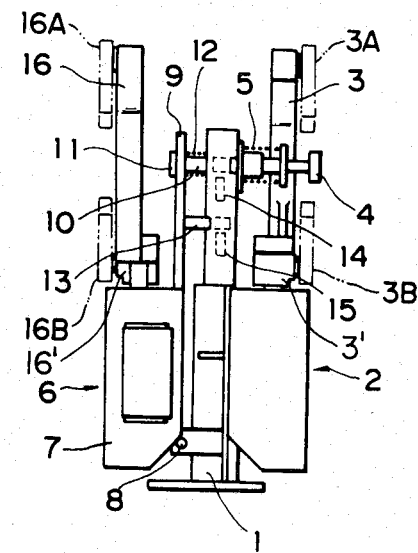

TWO-HANDED ROBOT DEVICE

FIELD OF THE INVENTION

The present invention relates to a two-handed robot device which is constructed so that the hands stop automatically at prescribed positions for grasping and releasing workpieces when transfer of the workpieces, such as when supplying workpieces to be machined and when retrieving machined workpieces, is conducted by the robot between a workpiece stand of a workpiece feeder and a machine tool.

BACKGROUND OF THE INVENTION

Controlling the stopping position of a robot hand has been conducted heretofore on the basis of programmed instructions. Therefore, instructions must be changed when the size of the workpieces and the number of workpieces to be handled is changed, thereby using much time and labor. Also, the conventional robot hand is provided with detectors only for detecting whether or not the hand has grasped the workpiece.

The present invention is designed to make it unnecessary to create instructions relating to the size of the workpiece and the number of workpieces to be handled. The invention does this with detectors provided in the robot hand which control the stopping position of the hand.

The present invention is summarized in the construction of a two-handed robot device, in which a hand supporting frame, which is moved to a position to grasp or release a workpiece by indexed rotation of a wristlike member, is provided with a first hand fixed on one side of the supporting frame, a striker which moves back against a spring force when touching a workpiece to be grasped by the first hand, a first detector which is made to operate by the backward movement of the striker, a second hand having its base portion fitted pivotally on the other side of the supporting frame so that it can be tilted from an engagement position toward the supporting frame and which is actuated toward the engagement position by a spring, and a second detector which is made to operate by said tilting movement of the second hand, and in which the movement of the first hand when approaching a workpiece and the movement of the second hand when approaching a workpiece stand are stopped according to the detection signals of the first and second detectors respectively.

BRIEF DESCRIPTION OF THE DRAWINGS

FIG. 1 shows an embodiment of the present invention.

FIG. 2 shows a side view thereof.

DETAILED DESCRIPTION

Figure 3:
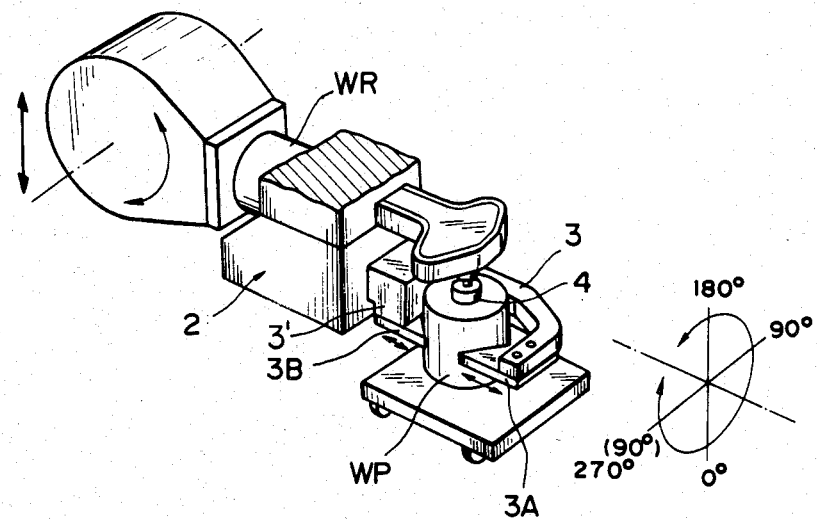
FIG. 3 is a cut away perspective view showing grasping action of the hand of the invention.

In FIGS. 1 and 2, there is illustrated a two-handed robot device having a supporting frame 1 which at its lower end is fixed to a wristlike member (not shown). A detailed description of this wristlike member is not given since it has no immediate connection with the features of the present invention.

A first hand 2 is fixed on one side of the supporting frame 1, which hand has a pair of fingers 3, 3' which are relatively movable toward and away from one another to hold a workpiece therebetween. A striker 4 is guided and supported by the supporting frame 1 so that it can be slid axially between the pair of fingers 3, 3'. Striker 4 is actuated by a spring 5 so that the tip of the striker projects outside (i.e. outwardly beyond) the fingers 3, 3' when the workpiece is not held thereby.

A second hand 6 is mounted on the other side of the supporting frame 1. This hand 6 has the lower end of the base portion 7 thereof fitted pivotally by a hinge 8 to the frame 1 so that the hand 6 can be tilted. A tilt plate 9 is fixed to the side of the base portion 7 and projects upwardly therefrom. Plate 9 is pressed by a spring 12 against the head 11 of a rod 10 fixed to the supporting frame 1. The hand 6 can be tilted about pivot 8 from its engagement position shown in FIG. 1 only toward the supporting frame 1. The tilt plate 9 is provided with a projecting striker 13 fixed thereto.

Inside the supporting frame 1 there are mounted a first detector 14 and a second detector 15 which are positioned to be operated by the backward movements of the strikers 4 and 13 respectively. When the fingers 3 approach (move rightwardly in FIG. 2) a workpiece to grasp it, the striker 4 touches the workpiece and is thereby moved backward, and by this backward movement the detector 14 is activated to stop the approaching movement of the fingers 3 toward the workpiece.

The second hand 6 also has a pair of fingers 16, 16' which are relatively movable toward and away from one another to grasp a workpiece therebetween. When fingers 16, 16' approach (move leftwardly in FIG. 2) a workpiece stand to put thereon a workpiece they hold, the workpiece touches the workpiece stand, and the base portion 7 of the hand is thereby tilted about axis 8, thus compressing the spring 12. With this tilting movement, the striker 13 operates the second detector 15 so as to stop the approaching movement of the fingers 16, 16' toward the workpiece stand.

The detectors 14 and 15 may be of any conventional construction such as mechanical or magnetic switches, proximity sensors, etc.

The present invention, having the above-described construction, has the stopping positions of the first and second hands set automatically in accordance with the size of the workpieces, the height of the workpiece stand or the number of workpieces to be handled. Therefore, instructions relating to the stopping positions, as required in the prior art, are unnecessary with this invention. The invention therefore offers great convenience in handling workpieces of various sizes, and greatly simplifies the structure of the device.

OPERATION

When the first hand 2 approaches a workpiece to be machined so as to grasp it, first the striker 4 touches the workpiece and it is thereby made to move back before the first hand 2 reaches the position at which it grasps the workpiece. When hand 2 reaches said position, the first detector 14 is operated by the striker 4 to stop the approaching movement of the first hand 2 toward the workpiece, and the workpiece is grasped at the prescribed position due to activation and relative movement of fingers 3, 3' toward one another in a conventional manner. When the second hand 6, holding a machined workpiece, approaches a workpiece stand to place the workpiece thereon, the workpiece touches the stand, and the hand 6 is thereby tilted. By this tilting movement, the second detector 15 is operated by the striker 13 to stop the approaching movement of the second hand toward the workpiece stand. Thereafter the second hand releases the workpiece and separates from the workpiece stand.

While moving between the workpiece stand and a machine tool for transferring the workpieces therebetween, the first and second hands simultaneously execute indexed rotation on the not-shown wristlike member.

FIG. 3 shows the grasping action of the hand 2. The finger 3, 3', respectively, may be provided with finger attachments 3A, 3B of any desired shape. Likewise, the fingers 16, 16', respectively, may be provided with finger attachments 16A, 16B (See FIG. 2).

In order to assist understanding of the present invention, also shown in FIG. 3 are a workpiece (WP) and a wrist-like member (WR).

It will be understood that the spring 5 will be compressed when the workpiece (WP) is held by the fingers 3, 3' and thus the spring is capable of urging the workpiece toward, for example, a chuck of a machine tool, when the fingers 3, 3' release the workpiece.

The embodiments of the invention in which an exclusive property or privilege is claimed are defined as follows:

1. A two handed robot device, comprising
a supporting frame;
a means to move the supporting frame;
a first hand supported on one side of said supporting frame and movable therewith toward a workpiece to be grasped;
means defining a striker supported on said supporting frame for movement back against a spring force upon touching a workpiece to be grasped by the first hand and first spring means acting on said striker for generating said spring force;
means defining a first detector responsive to said back movement of said striker for stopping said movement of said supporting frame and therewith said first hand toward said workpiece to be grasped;
a second hand having a base portion and means pivotally supporting said base portion of the second hand on the other side of said supporting frame for tilting from an engagement position toward the supporting frame and for movement with said supporting frame;
second spring means for actuating said second hand toward said engagement position; and
means defining a second detector responsive to said tilting movement of said second hand from said engagement position toward said supporting frame for stopping said movement of said supporting frame and therewith said second hand, said first and second hands being located back to back with said supporting frame sandwiched therebetween, said first and second hands facing in and being movable in opposite directions from said supporting frame, said hands each having an opposed pair of fingers, said striker having an extended position projecting between and outwardly beyond said fingers of said first hand, said striker having a retracted position offset inwardly beyond said fingers of said first hand and at which said striker operatively engages said first detector.

2. The apparatus of claim 1, in which said support frame is movable in said opposite directions, means defining a second striker carried on said base portion of said second hand and tiltable therewith for activating said second detector in response to engagement with a work stand by a workpiece carried by said fingers of said second hand in said engagement position of said second hand.

3. The apparatus of claim 2, in which said first and second detectors are mounted in a portion of said support frame extending into a zone between the finger pairs of the first hand and of second hand.

4. The apparatus of claim 3, in which said support frame is mounted for wrist-like rotation, such that said first and second hands simultaneously execute wrist-like rotation.

* * * * *